United States Patent
Lee et al.

(10) Patent No.: US 7,335,438 B2
(45) Date of Patent: Feb. 26, 2008

(54) BIPOLAR PLATE AND FUEL CELL INCLUDING THE SAME

(75) Inventors: Seung jae Lee, Gyeonggi-do (KR); Kyoung Hwan Choi, Gyeonggi-do (KR); Hyuk Chang, Gyeonngi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 674 days.

(21) Appl. No.: 10/772,452

(22) Filed: Feb. 6, 2004

(65) Prior Publication Data

US 2004/0191606 A1 Sep. 30, 2004

(30) Foreign Application Priority Data

Mar. 25, 2003 (KR) .................. 10-2003-0018502

(51) Int. Cl.
*H01M 8/02* (2006.01)
*H01M 8/04* (2006.01)
*H01M 8/10* (2006.01)

(52) U.S. Cl. .................... 429/38; 429/30; 429/26; 429/39; 429/34; 429/32

(58) Field of Classification Search ............... 429/38, 429/30, 39, 26, 34, 32
See application file for complete search history.

(56) References Cited

U.S. PATENT DOCUMENTS

| | | | |
|---|---|---|---|
| 5,527,363 A * | 6/1996 | Wilkinson et al. ......... 29/623.1 |
| 6,127,058 A | 10/2000 | Pratt et al. | |
| 6,132,895 A | 10/2000 | Pratt et al. | |
| 6,406,809 B1 * | 6/2002 | Fujii et al. .................... 429/34 |

* cited by examiner

*Primary Examiner*—Patrick Joseph Ryan
*Assistant Examiner*—Angela J. Martin
(74) *Attorney, Agent, or Firm*—Buchanan Ingersoll & Rooney PC

(57) ABSTRACT

A bipolar plate and a fuel cell using the same are provided. The bipolar plate includes a flow field that has a length between three and eight times greater than the square of the area of the bipolar plate. The fuel cell includes a first bipolar plate in which a fuel flow field having a length that is between three and eight times greater than the square of the area of the first bipolar plate is formed, and a second bipolar plate in which an air flow field having a length that is between three and eight times greater than the spare of the area of the second bipolar plate is formed. The fuel cell has a lower, uniform internal pressure and can produce a greater power.

46 Claims, 9 Drawing Sheets

BIPOLAR PLATE AND FUEL CELL INCLUDING THE SAME

BACKGROUND OF THE INVENTION

This application claims the priority of Korean Patent Application No. 2003-18502, filed on Mar. 25, 2003, in the Korean Intellectual Property Office, the disclosure of which is incorporated herein in its entirety by reference.

1. Field of the Invention

The present invention relates to a bipolar plate, and more particularly, to a fuel cell that has a lower internal pressure and can produce a high power.

2. Description of the Related Art

Fuel cells are electrochemical systems in which a free energy change resulting from a fuel oxidation reaction is converted into electrical energy. A fuel cell consists of three elements, i.e., an anode where reaction takes place, a cathode where a reduction reaction takes place, and an electrolyte disposed between the anode and the cathode to carry cations. In the anode, a fuel, such as hydrogen or methanol, loses electrons and transform into cations. In the cathode, cations accept the electrons supplied from the anode.

Figure 1A:
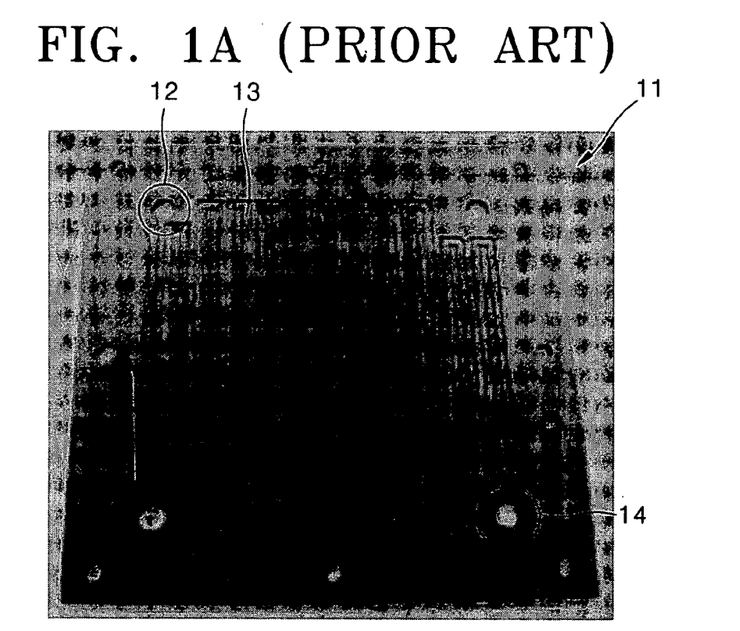
FIG. 1A is a plan view of a conventional anode bipolar plate for a fuel cell, in which a fuel flow field is formed.
Figure 1B:
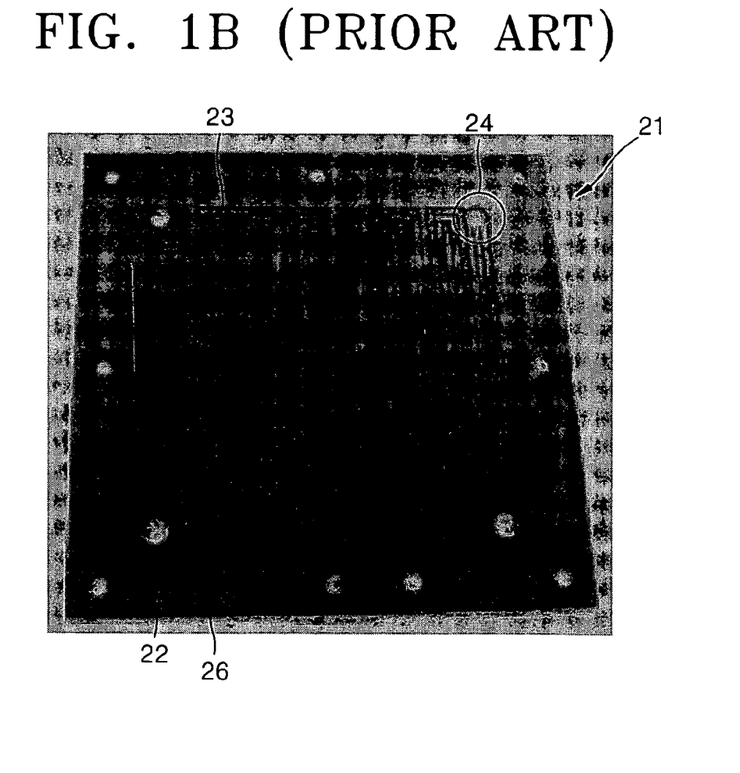
FIG. 1B is a plan view of a cathode bipolar plate having an air flow field.

FIG. 1A is a plan view of a conventional anode bipolar plate for a fuel cell, in which a fuel flow field is formed. FIG. 1B is a plan view of a conventional cathode bipolar plate having an air flow field.

Referring to FIGS. 1A and 1B, in a conventional fuel cell, a fuel flow field 13 and an air flow field 23 are 15 times or more longer than one side of first and second bipolar plates 11 and 21, which are square, respectively. A fuel inlet 12 and an air inlet 22 are diagonally opposite to a fuel outlet 14 and an air outlet 24, respectively. The fuel flow field 13 and the air flow field 23 are bent at right angle forming a serpentine pattern. Reference numeral 26 denotes a cooling fin.

The fuel flow field 13 and the air flow field 23 may be formed of a metallic network. In most cases, a graphite block with an engraved flow field, the graphite block being electrically conductive and having a predetermined thickness to tighten gas, is used for the fuel flow field 13 and the air flow field 23. The fuel flow field 13 and the air flow field 23 require complicated designs to evenly and continuously supply a fuel or an oxidant from the outermost cell to the innermost cell of the fuel stack. In addition, since a plurality of bipolar plates having such fuel and air flow fields are stacked into a fuel cell stack, it is difficult to hermetically seal the fuel cell stack. The conventional fuel cell stack has greater internal pressure variations, and the concentration of reactants is not uniform over the same reaction plate.

Figure 2:
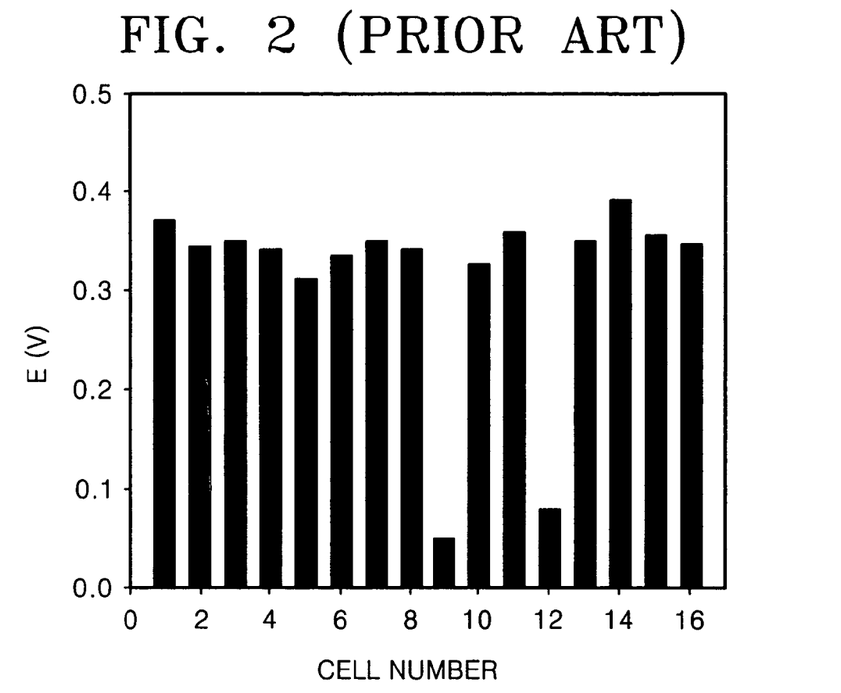
FIG. 2 is a graph of voltage distribution in a conventional fuel cell stack comprising a plurality of cells.

FIG. 2 is a graph of voltage distribution in a conventional fuel cell stack comprising a plurality of cells. Cells 9 and 12 show a great drop in voltage at 0.05V and 0.08V, respectively. As is apparent from FIG. 2, due to different voltages of the individual cells, the conventional fuel cell stack shows inconsistent voltage levels.

Figure 3:
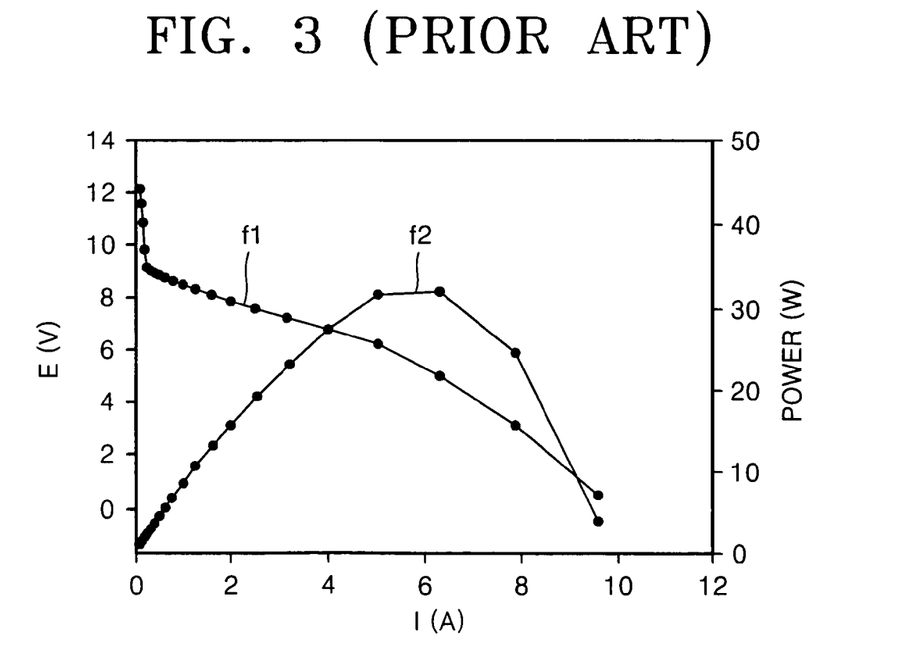
FIG. 3 is a graph illustrating changes in voltage and power versus current in a conventional fuel cell stack.

FIG. 3 is a graph illustrating changes in voltage (E) and power versus current in a conventional fuel cell stack. Referring to FIG. 3, the conventional fuel cell stack has a voltage of 5V at a current of 6A and a maximum power of about 30 W at that voltage. However, a lower voltage leads to a greater drop in power.

To solve these problems, U.S. Pat. No. 6,132,895 discloses a fuel cell with double sided distribution plates having liquid fuel channels and oxidant channels that act as heat exchangers. U.S. Pat. No. 6,127,058 discloses a fuel cell using a plastic frame with a current collector and including an anode and a cathode acting as a gas diffusion layer and a heat management layer, respectively. U.S. Pat. No. 5,527,363 discloses a fuel cell including compressible electroconductive plates with an intermediate plate therebetween, in which one of the compressible plates is embossed to effectively pressurize fluid.

Such conventional fuel cells can be manufactured at low costs through various structural modifications for multiple functions. However, due to a rise in internal pressure, reactions in the fuel cell retard and fuel and oxidant cannot be blocked from being mixed together and leaking. In addition, at a corner of the fuel cell where fluid changes direction, the fluid stays due to the formation of vortices, obstructing smooth fuel flow.

SUMMARY OF THE INVENTION

The present invention provides a fuel cell having an improved structure, in which the internal pressure of air and fuel flow fields is reduced, the inlets and outlets of the air and fuel flow fields are arranged facing the same direction to minimize spatial loss in the manufacture of electrodes, fuel and oxidant are blocked from being mixed together, and no vortex is formed in the fluid.

In one aspect, the present invention provides a bipolar plate for a fuel cell, the bipolar plate including a flow field through which one of a fuel and an oxidant is allowed to flow, wherein the flow field has a length that is between three and eight times greater than the square root of the area of the bipolar plate.

According to specific embodiments of the present invention, the flow field may be formed in a reaction plate that protrudes above or is recessed from a surface of the bipolar plate with a predetermined gap from the edge of the bipolar plate.

The flow field may comprise channels through which the fuel or the oxidant flows and a rib acting as a barrier between the channels, and the channels have a width that is between 1.3 and 2 times greater than the width of the rib. Each of the channels may have a length that is between three and eight times longer than the square of the area of the bipolar plate.

The flow field may include no more than sixty 90-degree turns or no more than twelve 180-degree turns. The 90-degree turns and 180-degree turns may be rounded.

The flow field may have an inlet and an outlet that are arranged on the same side and face the same direction.

The flow field may have an inlet and an outlet that are elliptical. Alternatively, the flow field may have an inlet and an outlet that are fan-shaped and have a width increasing away from the channels. The flow field may have an inlet and an outlet that have a 30-50% greater depth than the channels.

The bipolar plate may further comprise a thermoelement inlet in an edge region.

In another aspect, the present invention provides a fuel cell comprising: a first bipolar plate having a fuel flow field; a second bipolar plate having an air flow field; and a membrane electrode assembly interposed between the first and second bipolar plates and in which reactions of a fuel and an oxidant take place, wherein the fuel flow field has a length that is between three and eight times greater than the square root of the area of the first bipolar plate, and the air flow field has a length that is between three and eight times greater than the square root of the area of the second bipolar plate.

The fuel flow field or the air flow field may be formed in a reaction plate that protrudes above or is recessed from a surface of the first bipolar plate with a predetermined gap from the edge of the first bipolar plate.

The fuel flow field or the air flow field may comprise channels through which the fuel or the oxidant flows and a rib acting as a barrier between the channels, and the channels have a width that is between 1.3 and 2 times greater than the width of the rib.

The fuel flow field may include no more than sixty 90-degree turns or no more than twelve 180-degree turns. The air flow field may include no more than fifty 90-degree turns or no more than ten 180-degree turns. The 90-degree turns and the 180-degree turns may be rounded.

The fuel flow field or the air flow field may have an inlet and an outlet that are arranged on the same side and face the same direction.

An inlet of the fuel flow field may be separated from an inlet of the air flow field, with an outlet of the fuel flow field or an outlet of the air flow field therebetween. An outlet of the fuel flow field may be separated from an outlet of the air flow field, with an inlet of the fuel flow field or an inlet of the air flow field therebetween.

The fuel flow field or the air flow field may have an inlet and an outlet that are elliptical. The fuel flow field or the air flow field may have an inlet and an outlet that are fan-shaped and have a width increasing away from the channels. The fuel flow field or the air flow field may have an inlet and an outlet that have a 30-50% greater depth than the channels.

The first or second bipolar plate may comprise a thermoelement inlet in an edge region. The first bipolar plate may be an anode, and the second bipolar plate may be a cathode.

The internal pressure of the first bipolar plate may be in the range of 0.05-0.12 bar. The internal pressure of the second bipolar plate may be in the range of 0.02-0.08 bar.

Each of the channels may have a length that is between three and eight times longer than the square of the area of the first or second bipolar plate.

As described above, in a fuel cell according to the present invention, fuel and oxidant flow fields are formed to be three or eight times greater than the square of the area of the corresponding electrode and include rounded turns. As a result, variations in the internal pressure of the flow fields decrease, and carbon dioxide or water resulting from the reaction in the fuel cell can be rapidly discharged.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Embodiments of a bipolar plate and a fuel cell using the same according to the present invention will be described in detail with reference to the appended drawings.

Figure 4:
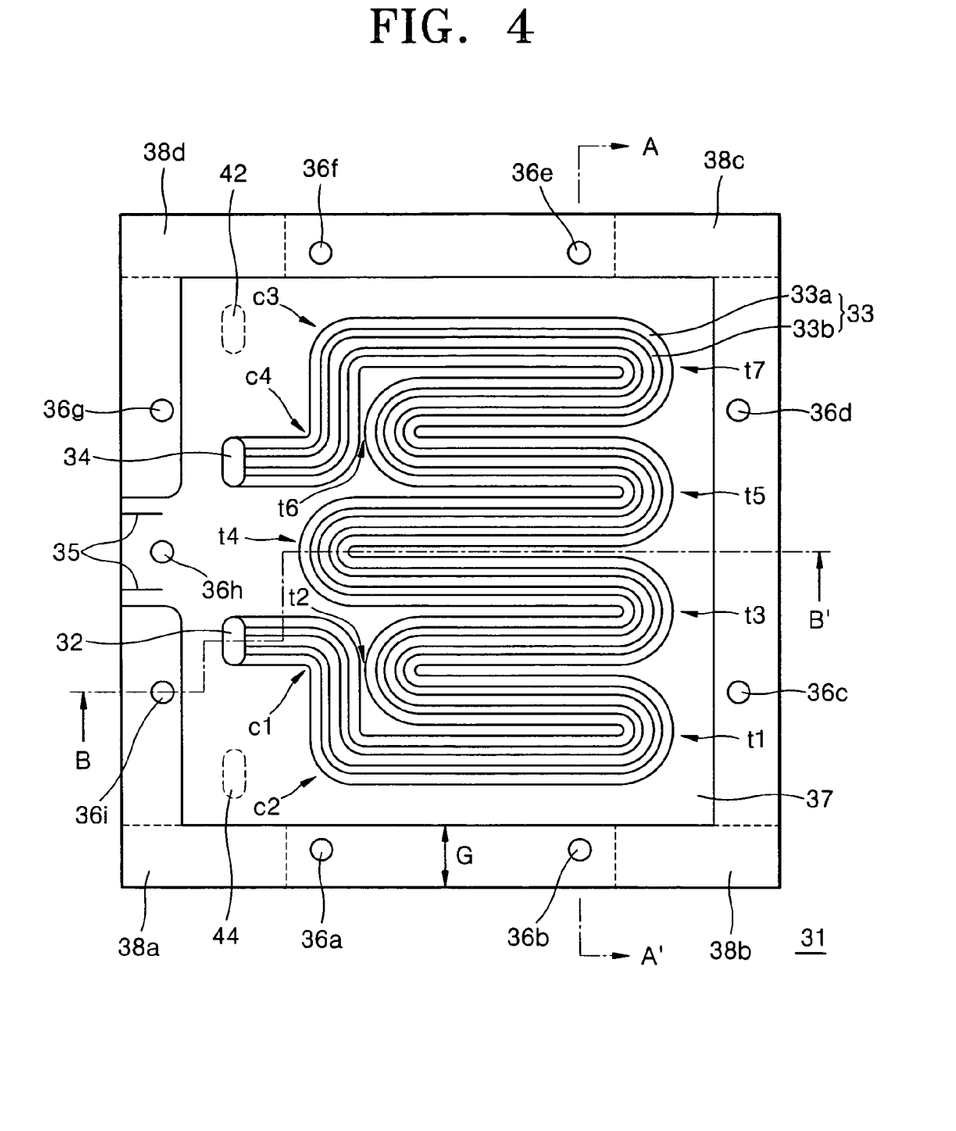
FIG. 4 is a plan view of a first bipolar plate according to an embodiment of the present invention.
Figure 5A:
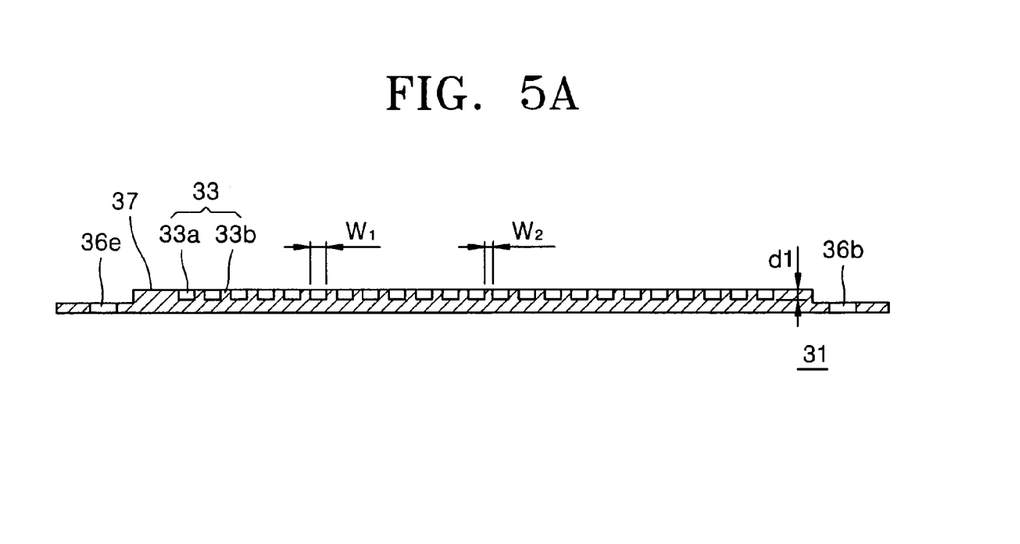
FIGS. 5A and 5B are sectional views taken along lines A-A' and B-B', respectively, in FIG. 4.
Figure 5B:
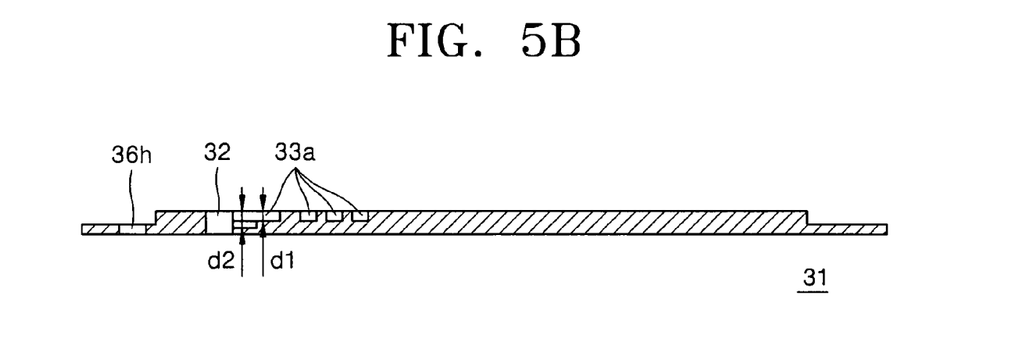

FIG. 4 is a plan view of a first bipolar plate according to an embodiment of the present invention. FIGS. 5A and 5B are sectional views taken along lines A-A' and B-B', respectively, in FIG. 4.

Referring to FIG. 4, a first bipolar plate 31 according to an embodiment of the present invention includes a reaction plate 37 that is rectangular is formed protruding a predetermined height above the first bipolar plate 31 with a predetermined gap G from the edge of the first bipolar plate 31. The reaction plate 37 may have a gasket to prevent external fuel leakage.

In the reaction plate 37, a first flow field 33 that has a serpentine shape is formed comprising an inlet 32 and an outlet 34 which face the same direction and through which a fuel or an oxidant is allowed to flow. The length of the first flow field 33 is three to eight times, preferably, four to seven times, greater than the square root of the area of the first bipolar plate 31. The length of the first flow field 33 is about one third shorter than the length of a conventional flow field. The first flow path 33 has a smaller number of 90- and 180-degree turns than a conventional flow field. Throughout the specification, 90-degree turns are also referred to as corners.

The first flow field 33 goes straight away from the inlet 32, turns at a first corner c1 by 90 degrees, moves away from the inlet 32, turns at a second corner c2 by 90 degrees, and moves away from the inlet 32. The first flow field 33 turns at a first turn t1 by 180 degrees, moves toward the inlet 32, turns at a second turn t2 by 180 degrees, and moves away from the inlet 32. The first flow field 33 turns more in this way at third through seventh turns t3, t4, t5, t6, and t7.

The length of the first flow field 33 between the third and fourth turns t3 and t4 and the length between the fourth and fifth turns t4 and t5 are longer than the length between the first and second turns t1 and t2, the length between the second and third turns t2 and t3, the length between the fifth and sixth turns t5 and t6, and the length between the sixth and seventh turns t6 and t7. The length between the first and second turns t1 and t2 and the length between the second and third turns t2 and t3 are the same as the length between the fifth and sixth turns t5 and t6 and the length between the sixth and seventh turns t6 and t7. The first flow field 33 that moves away from the seventh turn t7 turns at a third corner c3 by 90 degrees, moves away from the same, turns at a fourth corner c4 by 90 degrees, and moves toward the outlet 34. The first through fourth corners c1, c2, c3, and c4 and the first through seventh turns t1 through t7 of the first flow field 33 are rounded to minimize the formation of vortices in the fluid.

The first flow field 33 has a rib 33b acting as a barrier between channels 33a through which a fuel or an oxidant flows. The channels 33a are formed to a predetermined depth in the reaction plate 37. The first flow field 33 of the first bipolar plate 31 according to the present invention shown in FIG. 4 has three channels 33a extending parallel to one another from the inlet 32 to the outlet 34. However, the number of the channels 33 is not limited to three.

The rib 33b that has a predetermined height forms a ridge, whereas the channels 33a form valleys. Referring to FIG. 5A, according to the present invention, the width $W_1$ of the channels 33a and the width $W_2$ of the rib 33b have a ratio of about 1.5:1. The ratio of width $W_1$ to width $W_2$ may be varied depending on the kind and the flow rate of fluid passing through the channels 33a. In the bipolar plate with the above width ratio between the channels 33a and the rib 33b, the fuel or oxidant can flow through the channels 33a faster than in a conventional flow field. Since the channels 33a of the first flow field 33 according to the present invention have a wider width than the rib 33b, the first flow field 33 allows smoother fluid flow compared to a conventional flow field having channels and a rib that are equal in width.

Referring back to FIG. 4, in the space between the edge of the first bipolar plate 31 and the edge of the reaction plate 37, two binding holes for each side of the reaction plate 37, i.e., eight binding holes, in total, 36a, 36b, 36c, 36d, 36e, 36f, 36g, and 36i, and one wire hole 36h are formed. The eight binding holes 36a, 36b, 36c, 36d, 36e, 36f, 36g, and 36i are coupled with coupling members, for example, screws, to fix a membrane electrode assembly (MEA, not shown) interposed between the first bipolar plate 31 and a second bipolar plate (not shown). A fuel is injected through one of the first and second bipolar plates, and an oxidant is injected through the other. As is apparent from FIG. 5A, which is taken along line A-A' of FIG. 4, the binding holes 36e and 36b are formed opposite to each other through the first bipolar plate 31. The other binding holes 36a, 36f, 36c, 36i, 36d, and 36g are arranged opposite to one another, like the binding holes 36e and 36b.

Referring back to FIG. 4, adjacent to the inlet 32 and the outlet 34 of the first flow path 33, which are spaced apart from each other, an outlet 44 and an inlet 42 of a second flow field (not shown) are positioned. The inlet 32 of the first flow field 33 and the inlet 42 of the second flow field are separated from each other, with the outlet 34 of the first flow field 31 therebetween to prevent a fuel, especially a liquid fuel injected into the MEA, and an oxidant from leaking and being mixed together. Likewise, the outlet 34 of the first flow field 33 and the outlet 44 of the second flow field are separated from each other, with the inlet 32 of the first flow field 33 therebetween. Such arrangement of the inlets and outlets of the flow fields allows the first bipolar plate 31 and another bipolar plate (not shown) to have a rectangular shape that results in a fuel cell having a larger reaction area. Furthermore, electrodes can be more easily mass produced and can be applied more widely.

The inlet 32 and the outlet 34 of the first flow field 33 and the inlet 42 and the outlet 44 of the second flow field are elliptical so that the fuel or oxidant can be more smoothly supplied and discharged. Referring to FIG. 5B, the wire hole 36h is formed through the first bipolar plate 31 in an edge portion near the inlet 32 and the outlet 34 of the first flow field 33. The inlet 32 of the first flow field 33 has a greater depth $d_2$ than the channel 33a that has a depth $d_1$ (see FIG. 5A). The depth $d_2$ may be about 50% greater than the depth $d_1$. The outlet 34 of the first flow field 33 and the inlet 42 and the outlet 44 of the second flow field have the same depth as the depth $d_2$. The depth and shape of the inlet and outlet of flow fields are important design factors that must be considered to induce a smooth flow of a fuel or oxidant.

In the anode of a direct liquid fuel cell, methanol and water react on a catalyst to produce protons, electrons, and carbon dioxide. This carbon dioxide is a by-product that has no concern with energy generation and rather hinders the reactants from reaching a reaction site by occupying the reaction site in the cell. In the cathode of the direct liquid fuel cell, the protons and electrons transferred from the anode react with the air to produce electricity, water, and heat. The produced water must be removed immediately from the cell to allow the air to reach the reaction site more smoothly without resistance. These aspects are considered in determining design factures, such as the length of flow fields, the widths of channels and a rib, the numbers of 90- and 180-degree turns, and the shape and depth of the inlets and outlets of the flow fields.

In addition to the above-described first flow field 33, cooling fins 38a, 38b, 38c, and 38d are formed at four corners of the first bipolar plate 31. When manufacturing a fuel cell stack by combining together a plurality of bipolar plates having, for example, the structure of the first bipolar plate 31 described in the above embodiment of the present invention or another structure modified from the first bipolar plate 31, the binding holes 36a, 36b, 36c, 36d, 36e, 36f, 36g, and 36i may be positioned between the cooling fins 38a, 38b, 38c, and 38d to prevent the corners of the bipolar plates from being broken by stress. In addition, to measure the reaction temperature, a thermoelement inlet 35 is located in a middle portion of the edge of the reaction plate 37 adjacent to the inlet 32 and the outlet 34 and extends to the edge of the first bipolar plate.

Figure 6:
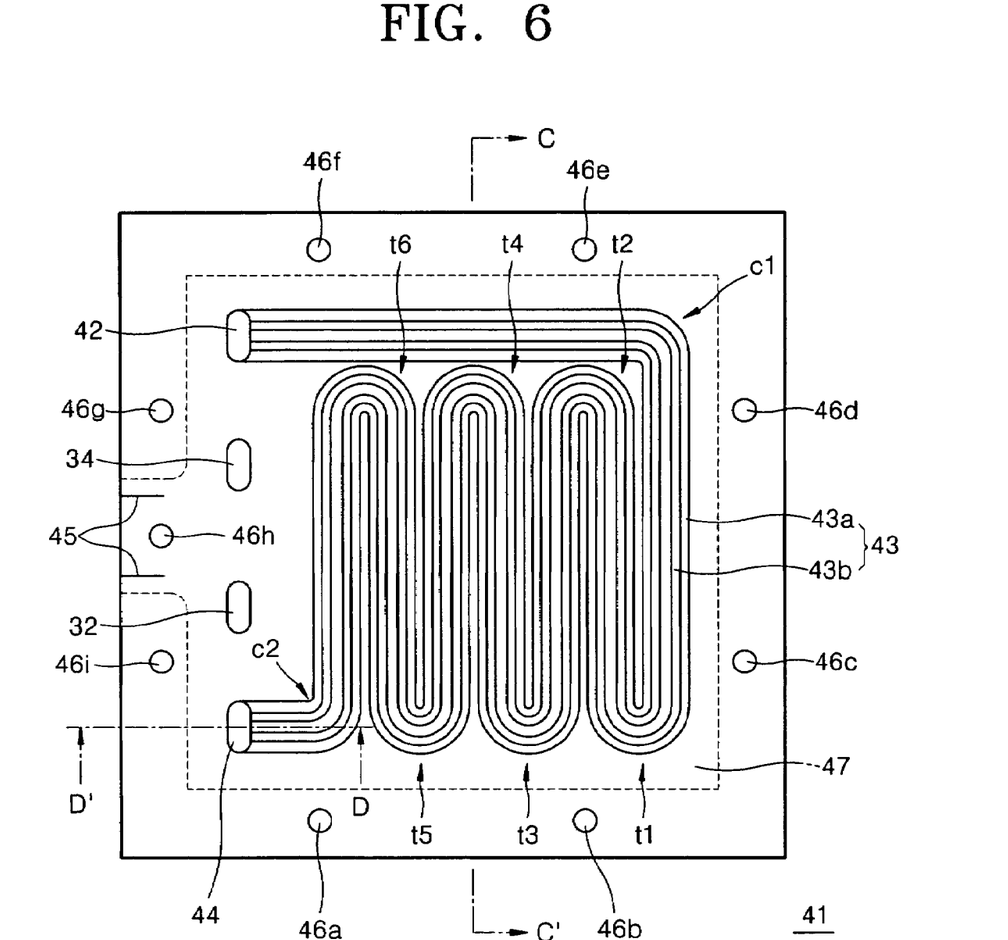
FIG. 6 is a plan view of a second bipolar plate according to another embodiment of the present invention.
Figure 7A:
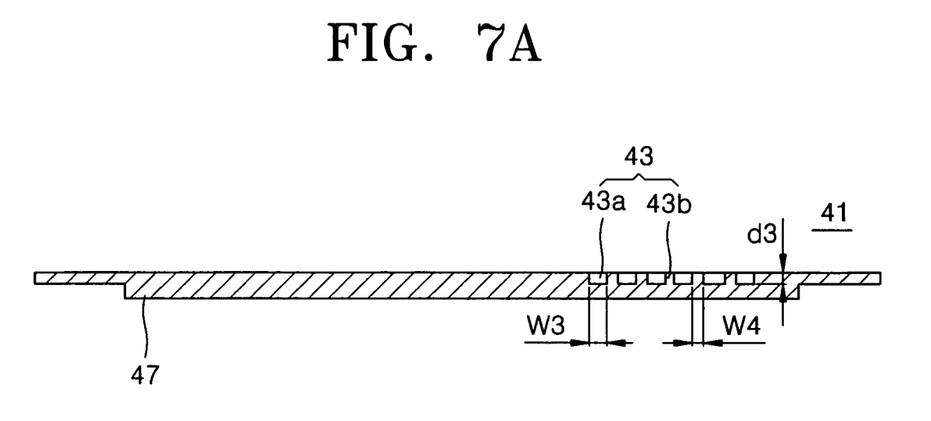
FIGS. 7A and 7B are sectional views taken alone lines C-C' and D-D', respectively, in FIG. 6.
Figure 7B:
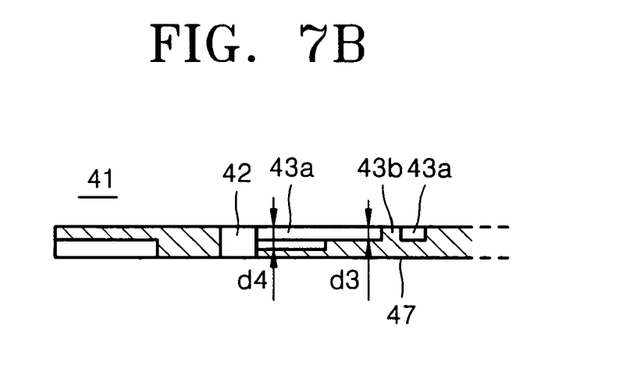

FIG. 6 is a plan view of a second bipolar plate according to another embodiment of the present invention, which may be coupled with the first bipolar plate 31 of FIG. 4. FIGS. 7A and 7B are sectional views taken along lines C-C' and D-D', respectively, in FIG. 6. In FIG. 6, reference numeral 41 denotes a second bipolar plate, reference numeral 43 denotes a second flow field, reference numeral 43a denotes channels, reference numeral 43b denotes a rib, reference numerals 42 and 44 denotes the inlet and outlet of the second flow field 43, respectively, reference numeral 45 denotes a thermoelement inlet, reference numerals 46a through 46i denote binding holes, reference numeral 46h denotes a wire hole, and reference numeral 47 denotes a reaction plate.

A reaction plate 47 that is rectangular is formed recessed a predetermined depth from the surface of the second bipolar plate 41 with a predetermined gap from the edge of the second bipolar plate 41. In the reaction plate 47, a second flow field 43 that has a serpentine shape is formed comprising channels 43a having a predetermined depth and a rib 43b having a predetermined height between the channels 43a.

The second flow field 43 has an inlet 42 and an outlet 44 which face the same direction, and the inlet 32 and the outlet 34 of the first flow field 33 (see FIG. 4) are located between the inlet 42 and the outlet 44 of the second flow field 43. Similar to the arrangement of the inlet 32 and the outlet 34 of the first flow field 33 described above, the inlet 42 and the outlet 44 are spaced a predetermined distance apart from one another. The inlet 42 of the second flow field 43 and the inlet 32 of the first flow field 33 are separated from each other, with the outlet 34 of the first flow field 33 therebetween. The outlet 44 of the second flow field 43 and the outlet 34 of the first flow field 33 are separated from each other, with the inlet 32 of the first flow field 33 therebetween. This arrangement of the inlet 42 and the outlet 44 of the second flow field 43 is for preventing a fuel and an oxidant from being mixed together, like the geometry of the inlet 32 and outlet 34 of the first flow field 33 described above.

The second flow field 43 has two 90-degree turns, i.e., first and second corners c1 and c2, and six 180-degree turns, i.e., first through sixth turns t1 through t6. Like the first flow field 33 described above, the corners c1 and c2 and the first through sixth turns t1 through t6 in the second flow field 43 are rounded to prevent the formation of vortices in the fluid. The channels 43*a* of the second flow field 43 are designed such that they goes across the channels 33*a* of the first flow field 33 shown in FIG. 4 to induce uniform electrochemical reactions over the entire reaction plate 37 (47).

Referring to FIG. 7A, the channels 43*a* formed in the reaction plate 47 of the second bipolar plate 41 has a depth d3 and a width w3. The width w3 of the channels 43*a* and the width w4 of the rib 43*b* may have a ratio of 1.5:1. The width w3 and depth d3 of the channels 43 and the width w4 of the rib 43*b* may be varied depending on the desired flow rate of fluid that flows through the channels 43*a*.

Referring to FIG. 7B, the inlet 42 of the second flow field 43 is formed to have a depth d4 that is greater than the depth d3 of the channels 43*a*. Similar to the inlet 32 and the outlet 34 of the first flow field 33 shown in FIG. 5B, the inlet 42 and the outlet 44 of the second flow field are formed to be deeper and wider than the channels 43*a* so that a fuel or an oxidant can be more smoothly supplied to and discharged from the second flow field 43.

The shapes of the first and second bipolar plates 31 and 41 according to the present invention described in the above embodiments are for illustrative purposes, and thus may be varied without limitations. For example, the inlet 32 and outlet 34 of the first flow field 33 and the inlet 42 and outlet 44 of the second flow field 43 may have a fanlike shape having a width that decreases toward the channels 33*a* and 43*a* and increases away from the channels 33*a* and 43*a*. A fuel is injected into the first bipolar plate 31 whereas an oxidant is injected into the second bipolar plate 41. Alternatively, a fuel may be injected into the second bipolar plate 41 whereas an oxidant is injected into the first bipolar plate 31.

Figure 8:
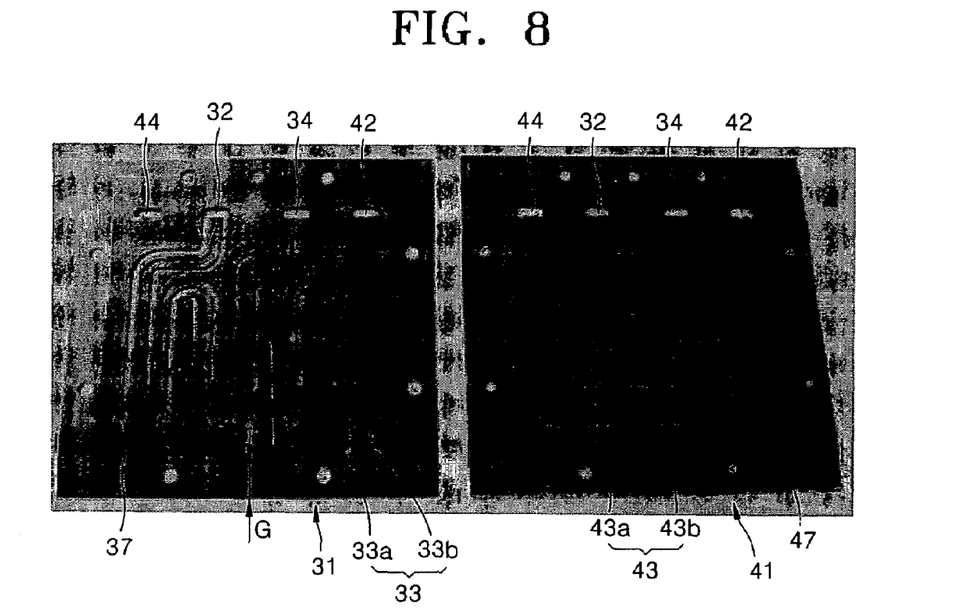
FIG. 8 is a photograph of samples of the first bipolar plate of FIG. 4 and the second bipolar plate of FIG. 6.

FIG. 8 is a photograph of samples of the first bipolar plate 31 of FIG. 4 and the second bipolar plate 41 of FIG. 6. The first and second bipolar plates 31 and 41 were made of graphite to have a thickness of 2 mm and an area of 100 cm$^2$. The inlets 32 and 42 and the outlets 34 and 44 of the first and second flow fields 33 and 43 were manufactured in 3-mm wide and 8-mm long elliptical form and were positioned at a 10-mm interval. The reaction area of each of the first and second bipolar plates 31 and 41 was 37 cm$^2$, and the lengths of the channels 33*a* and 43*a* were 53 cm and 43 cm, respectively.

Figure 9:
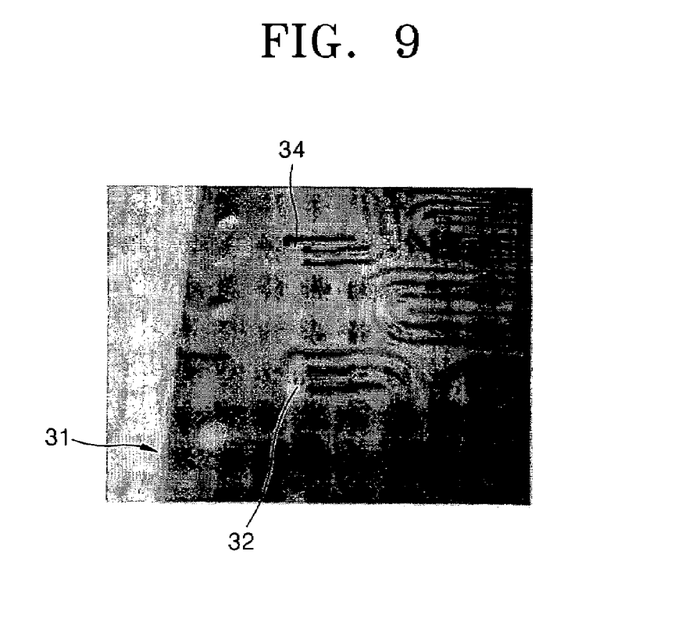
FIG. 9 is a magnified photograph showing a channel portion of the first bipolar plate in FIG. 8.

FIG. 9 is a magnified photograph showing the channels 33*a* of the first bipolar plate 31 in FIG. 8. Referring to FIGS. 8 and 9, the first and second channels 33*a* and 43*a* had a depth of 0.7 mm and a width of 1.7 mm. The ribs 33*b* and 43*b* had a width of 1.1 mm. The width ratio of the channels to the ribs was 1.5:1. A gap G of 0.6 mm appeared between the reaction plate 37 (47) and the edge of the first (second) bipolar plate 31 (41). Although not shown in FIGS. 8 and 9, cooling fins having a width of 10 mm may be formed at the corners of the first (second) bipolar plate 31 (41).

Table 1 below comparatively shows design parameters for a conventional bipolar plate as shown in FIG. 1 and the first and second bipolar plates 31 and 41 shown in FIG. 8 according to the present invention.

TABLE 1

| Design Parameter | | Prior Art | Present Invention |
|---|---|---|---|
| Number of channels | | 2 channels for methanol | 3 channels for methanol |
| | | 3 channels for air | 3 channels for air |
| Arrangement of inlet and outlet | | Arranged diagonally opposite to each other and facing opposite directions | Arranged on the same side and facing the same direction |
| Total Area (cm$^2$) | | 100 | 100 |
| Reaction Area (cm$^2$) | | 45 | 37 |
| Area of Cooling Fins (cm$^2$) | | 34 | 34 |
| Channel length (cm) | Methanol | 160 | 53 |
| | Air | 108 | 47 |
| Numbers of Corners and Turns in Channel | Methanol | 88 Corners/22 Turns | 54 Corners/9 Turns |
| | Air | 42 Corners/14 Turns | 42 Corners/7 Turns |
| Shape of Corners in Channel | | Right angled | Rounded |
| Channel Depth (cm) | | 0.7 | 0.7 |
| Width of channel (cm) | | 0.7 | 1.7 |
| Width of rib (cm) | | 0.8 | 1.1 |

As shown in Table 1, the first (second) bipolar plate according to the present invention has a smaller reaction area of 37 cm$^2$ than the conventional bipolar plate that has a reaction area of 45 cm$^2$. The methanol and air flow fields of the first (second) bipolar plate according to the present invention have a channel length of 53 cm and 47 cm, respectively, which are between one third and one half less than the conventional bipolar plate having a 160-cm long methanol flow field and a 108-cm long air flow channel. The first (second) bipolar plate according to the present invention has 54 corners (90-degree turns) in the methanol flow, which is smaller than the conventional bipolar plate having 88 corners, and 42 corners in the air flow field, which is the same as the conventional bipolar plate. The bipolar plate according to the present invention has 9 turns (180-degree turns) in the methanol field flow and 7 turns in the air flow field, which are about one third fewer than the conventional bipolar plate that has 22 turns in the methanol flow field and 14 turns in the air flow field. From the comparison of the design parameters, it can be inferred that a fuel or oxidant flows faster in the bipolar plate according to the present invention than in the conventional bipolar plate with a smaller variation in internal pressure.

Figure 10:
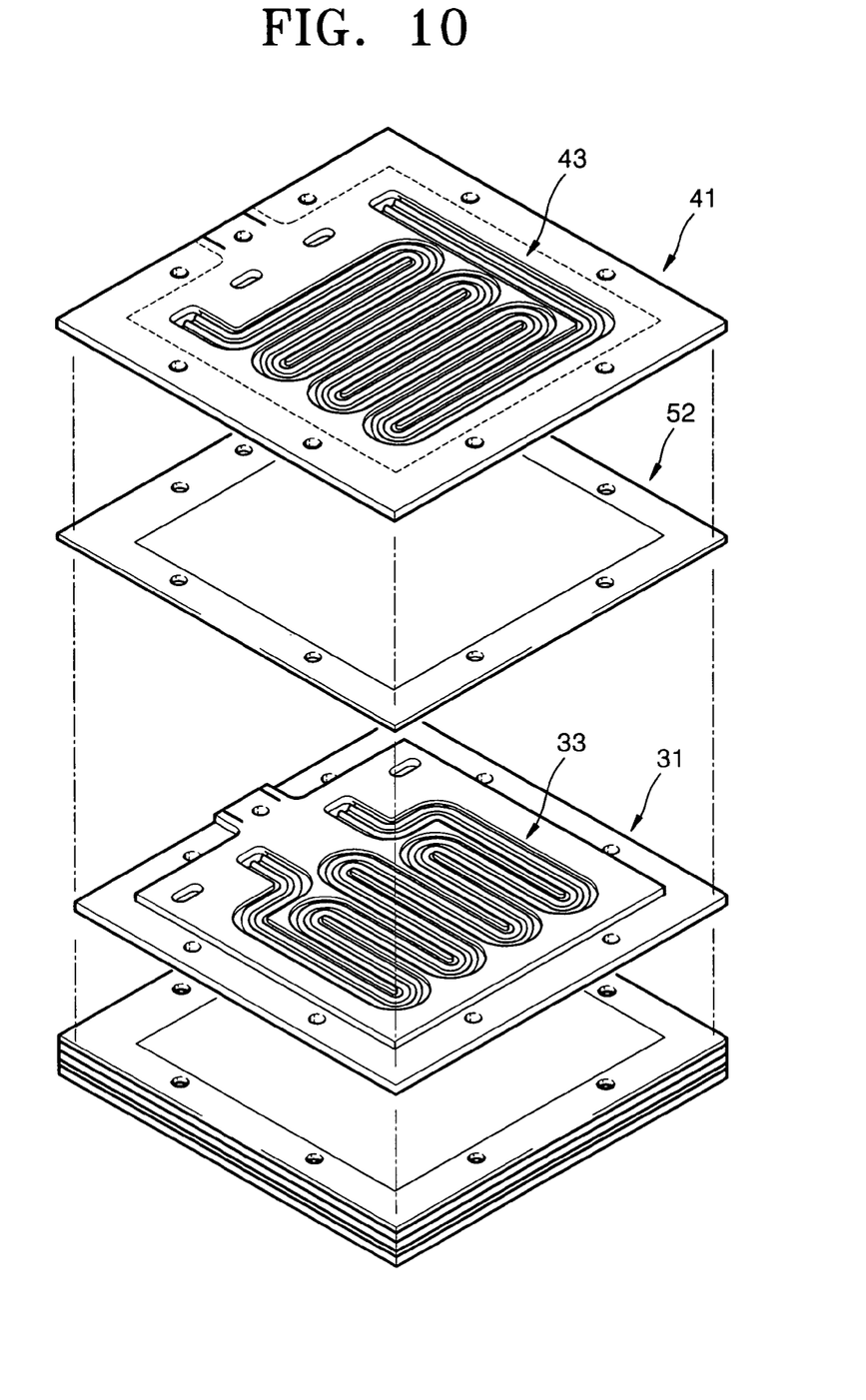
FIG. 10 is an exploded perspective view of a fuel cell using the first bipolar plate of FIG. 4 and the second bipolar plate of FIG. 6.

FIG. 10 is an exploded perspective view of a fuel cell using the first bipolar plate of FIG. 4 and the second bipolar plate of FIG. 6. An MEA 52 where electrochemical reactions between a fuel and an oxidant take place is interposed between the first bipolar plate 31 into which the fuel, which may be methanol, is injected and the second bipolar plate 41 into which the oxidant, which may be the air, is injected. In a direct liquid fuel cell, methanol is supplied as a fuel through the first flow field 33 of the first bipolar plate 31 acting as an anode, whereas the air is supplied as an oxidant through the second flow field 43 of the second bipolar plate 41 acting as a cathode. The methanol and water react in the MEA 52 to produce protons, electrons, and carbon dioxide. This carbon dioxide is a by-product that does not participate in energy generation and may interrupt the reactants from reaching a reaction site, especially when a large amount of carbon dioxide stays and occupies the reaction site of the cell. In the cathode, the protons and electrons transferred from the first bipolar plate 31 react with the air to produce electricity, water, and heat. In the first and second bipolar plates 31 and 41 according to the embodiment of the present invention, the water resulting from the reactions can be easily removed so that the air acting as the oxidant is allowed to reach the reaction site more easily with less transfer resistance.

Figure 11:
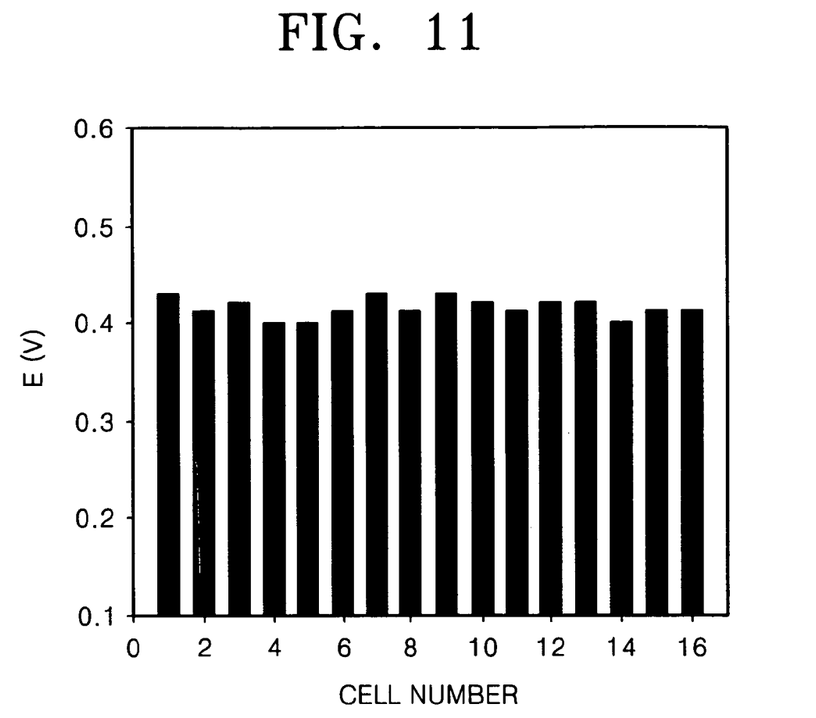
FIG. 11 is a graph of voltage distribution for a fuel cell stack that includes the first and second bipolar plates, according to an embodiment of the present invention.

FIG. 11 is a graph of voltage distribution for a fuel cell stack that includes the above bipolar plates according to the present invention. In FIG. 11, the X-axis denotes cell number. As shown in FIG. 11, the voltages of the individual cells evenly distribute, unlike the voltage distribution of the conventional bipolar plate shown in FIG. 2.

Figure 12:
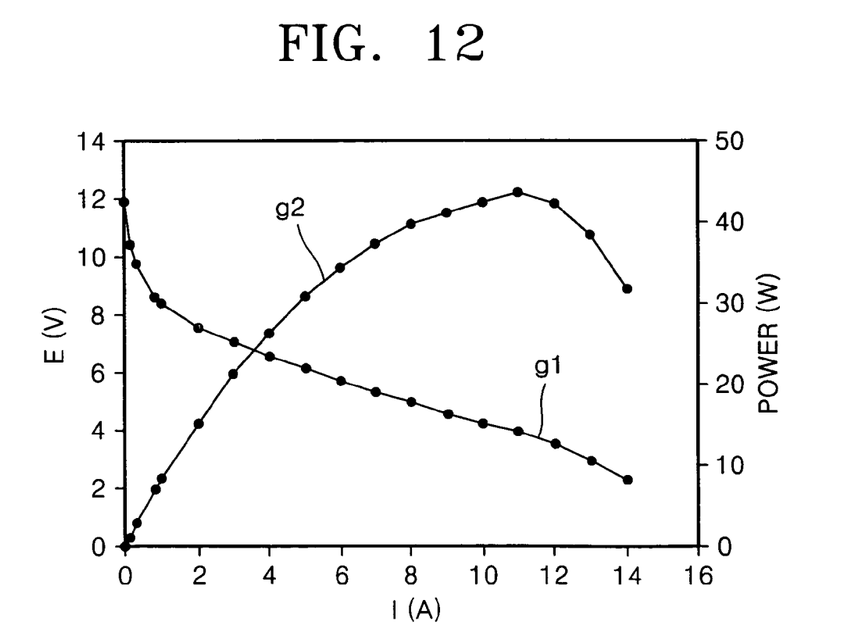
FIG. 12 is a graph of voltage (g1) and power (g2) versus current for a fuel cell stack that includes the first and second bipolar plates according to the present invention.

FIG. 12 is a graph of voltage (g1) and power (g2) versus current for a fuel cell stack that has the above bipolar plates according to the present invention. Comparing to FIG. 3, which is a graph of voltage (f1) and power (f2) versus current for the conventional fuel cell stack, the fuel cell stack according to an embodiment of the present invention shows a greater voltage level of 5V at the same current level of 8A than the conventional fuel cell stack. The fuel cell stack according to the present invention shows a maximum power of about 44 W at 4V, which is about 47% higher than the conventional full cell stack that has a maximum power of about 30 W.

In the bipolar plate according to the present invention, an internal pressure variation is reduced to 10-20 times lower than the conventional bipolar plate. In particular, the bipolar plate according to the present invention has an internal pressure variation of about 0.08 bar in the anode (fuel side) and about 0.05 bar in the cathode (oxidant side), which are smaller than an internal pressure variation in the conventional bipolar plate that is 1.92 bars in the anode and 0.8 bars in the cathode.

As described above, a bipolar plate according to the present invention that can be used an anode and a cathode of a fuel cell stack is manufactured with optimized design factors, such as the length, depth, and width of channels, the numbers of 90- and 180-degree turns, etc. The bipolar plate according to the present invention leads to a smaller internal pressure variation and a greater reaction rate, thereby allowing a greater power to be generated. In particular, the geometry of an entry portion of a flow field, i.e., the depth and width of the inlet and outlet of the flow field, is optimized to improve a performance of the fuel cell stack.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bipolar plate for a fuel cell, the bipolar plate including a flow field through which one of a fuel and an oxidant is allowed to flow,
wherein the flow field has a length from inlet to outlet that is between three and eight times greater than the square root of the area of the bipolar plate.

2. The bipolar plate of claim 1, wherein the flow field is formed in a reaction plate that protrudes above a surface of the bipolar plate with a predetermined gap from the edge of the bipolar plate.

3. The bipolar plate of claim 1, wherein the flow field is formed in a reaction plate that is recessed from a surface of the bipolar plate with a predetermined gap from the edge of the bipolar plate.

4. The bipolar plate of claim 1, wherein the flow field comprises channels through which the fuel or the oxidant flows and a rib acting as a barrier between the channels, and the channels have a width that is between 1.3 and 2 times greater than the width of the rib.

5. The bipolar plate of claim 4, wherein each of the channels has a length that is between three and eight times longer than the square root of the area of the bipolar plate.

6. The bipolar plate of claim 1, wherein the flow field includes no more than sixty 90-degree turns.

7. The bipolar plate of claim 1, wherein the flow field includes no more than twelve 180-degree turns.

8. The bipolar plate of claim 6, wherein the 90-degree turns are rounded.

9. The bipolar plate of claim 7, wherein the 180-degree turns are rounded.

10. The bipolar plate of claim 1, wherein the fuel flow field has four sides on the perimeter of the fuel flow field, wherein an inlet is located on a first side of the fuel flow field and faces a first direction and an outlet also located on the first side of the fuel flow field and also faces the first direction such that the inlet and the outlet are arranged on the same side and face the same direction.

11. The bipolar plate of claim 10, wherein the flow field has an inlet and an outlet that are elliptical.

12. The bipolar plate of claim 4, wherein the flow field has an inlet and an outlet that are fan-shaped and have a width increasing away from the channels.

13. The bipolar plate of claim 4, wherein the flow field has an inlet and an outlet that have a 30-50% greater depth than the channels.

14. The bipolar plate of claim 1, further comprising a thermoelement inlet in an edge region.

15. A fuel cell comprising:
a first bipolar plate having a fuel flow field;
a second bipolar plate having an air flow field; and
a membrane electrode assembly interposed between the first and second bipolar plates and in which reactions of a fuel and an oxidant take place,
wherein the fuel flow field has a length from inlet to outlet that is between three and eight times greater than the square root of the area of the first bipolar plate, and the air flow field has a length that is between three and eight times greater than the square root of the area of the second bipolar plate.

16. A fuel cell comprising:
a first bipolar plate having a fuel flow field wherein the fuel flow field is formed in a reaction plate that protrudes above a surface of the first bipolar plate with a predetermined gap from the edge of the first bipolar plate;
a second bipolar plate having an air flow field; and
a membrane electrode assembly interposed between the first and second bipolar plates and in which reactions of a fuel and an oxidant take place,
wherein the fuel flow field has a length from inlet to outlet that is between three and eight times greater than the square root of the area of the first bipolar plate, and the air flow field has a length from inlet to outlet that is between three and eight times greater than the square root of the area of the second bipolar plate.

17. A fuel cell comprising:
a first bipolar plate having a fuel flow field;
a second bipolar plate having an air flow field; and
a membrane electrode assembly interposed between the first and second bipolar plates and in which reactions of a fuel and an oxidant take place, wherein the fuel flow field has a length from inlet to outlet that is between three and eight times greater than the sguare root of the area of the first bipolar plate, and the air flow field has a length from inlet to outlet that is between three and eight times greater than the sguare root of the area of the second bipolar plate, and wherein the flow field is formed in a reaction plate that is recessed from a surface of the first bipolar plate with a predetermined gap from the edge of the first bipolar plate.

18. The fuel cell of claim 15, wherein the air flow field is formed in a reaction plate that protrudes above a surface of the second bipolar plate with a predetermined gap from the edge of the second bipolar plate.

19. The fuel cell of claim 15, wherein the air flow field is formed in a reaction plate that is recessed from a surface of the second bipolar plate with a predetermined gap from the edge of the second bipolar plate.

20. The fuel cell of claim 16, wherein the fuel flow field comprises channels through which the fuel flows and a rib acting as a barrier between the channels, and the channels have a width that is between 1.3 and 2 times greater than the width of the rib.

21. The fuel cell of claim 18, wherein the air flow field comprises channels through which the fuel flows and a rib acting as a barrier between the channels, and the channels have a width that is between 1.3 and 2 times greater than the width of the rib.

22. The fuel cell of claim 19, wherein the air flow field comprises channels through which the fuel flows and a rib acting as a barrier between the channels, and the channels have a width that is between 1.3 and 2 times greater than the width of the rib.

23. The fuel cell of claim 16, wherein the fuel flow field includes no more than sixty 90-degree turns.

24. The fuel cell of claim 16, wherein the fuel flow field includes no more than twelve 180-degree turns.

25. The fuel cell of claim 15, wherein the air flow field includes no more than fifty 90-degree turns.

26. The fuel cell of claim 15, wherein the air flow field includes no more than ten 180-degree turns.

27. The fuel cell of claim 23, wherein the 90-degree turns are rounded.

28. The fuel cell of claim 25, wherein the 180-degree turns are rounded.

29. The fuel cell of claim 24, wherein the 180-degree turns are rounded.

30. The fuel cell of claim 16, wherein the fuel flow field has four sides on the perimeter of the fuel flow field, wherein an inlet is located on a first side of the fuel flow field and faces a first direction and an outlet also located on the first side of the fuel flow field and also faces the first direction such that the inlet and the outlet are arranged on the same side and face the same direction.

31. The fuel cell of claim 15, wherein the air flow field has four sides on the perimeter of the air flow field, wherein an inlet is located on a first side of the air flow field and faces a first direction and an outlet also located on the first side of the air flow field and also faces the first direction such that the inlet and the outlet are arranged on the same side and face the same direction.

32. The fuel cell of claim 15, wherein an inlet of the fuel flow field is separated from an inlet of the air flow field, with an outlet of the fuel flow field or an outlet of the air flow field therebetween.

33. The fuel cell of claim 15, wherein an outlet of the fuel flow field is separated from an outlet of the air flow field, with an inlet of the fuel flow field or an inlet of the air flow field therebetween.

34. The fuel cell of claim 16, wherein the fuel flow field has an inlet and an outlet that are elliptical.

35. The fuel cell of claim 15, wherein the air flow field has an inlet and an outlet that are elliptical.

36. The fuel cell of claim 20, wherein the fuel flow field has an inlet and an outlet that fan-shaped and have a width increasing away from the channels.

37. The fuel cell of claim 21, wherein the air flow field has an inlet and an outlet that fan-shaped and have a width increasing away from the channels.

38. The fuel cell of claim 20, wherein the fuel flow field has an inlet and an outlet that have a 30-50% greater depth than the channels.

39. The fuel cell of claim 21, wherein the air flow field has an inlet and an outlet that have a 30-50% greater depth than the channels.

40. The fuel cell of claim 15, whereln the first bipolar plate comprises a thermoelement inlet in an edge region.

41. The fuel cell of claim 15, wherein the second bipolar plate comprises a thermoelement inlet in an edge region.

42. The fuel cell of claim 15, wherein the first bipolar plate is an anode, and the second bipolar plate is a cathode.

43. The fuel cell of claim 15, wherein the internal pressure of the first bipolar plate is in the range of 0.05-0.12 bar.

44. The fuel cell of claim 15, wherein the internal pressure of the second bipolar plate is in the range of 0.02-0.08 bar.

45. The fuel cell of claim 20, wherein each of the channels has a length from inlet to outlet that is between three and eight times longer than the square root of the area of the first bipolar plate, wherein the fuel flow field includes no more than sixty 90-degree turns.

46. The fuel cell of claim 21, wherein each of the channels has a length from inlet to outlet that is between three and eight times longer than the square root of the area of the second bipolar plate, wherein the fuel flow field includes no more than twelve 180-degree turns.

* * * * *